(12) United States Patent
Layfield et al.

(10) Patent No.: US 10,449,954 B2
(45) Date of Patent: Oct. 22, 2019

(54) METHOD AND APPARATUS FOR AN ACTIVE CONVERTOR DOLLY

(71) Applicant: Brian P. Layfield, Oakville (CA)

(72) Inventors: Brian P. Layfield, Oakville (CA); Amir Khajepour, Waterloo (CA)

(73) Assignee: Brian P. Layfield, Oakville (CA)

( * ) Notice: Subject to any disclaimer, the term of this patent is extended or adjusted under 35 U.S.C. 154(b) by 201 days.

(21) Appl. No.: 15/608,098

(22) Filed: May 30, 2017

(65) Prior Publication Data

US 2018/0345952 A1  Dec. 6, 2018

(51) Int. Cl.
*B60W 30/02* (2012.01)
*B62D 59/04* (2006.01)
(Continued)

(52) U.S. Cl.
CPC ........... *B60W 30/02* (2013.01); *B60K 7/0007* (2013.01); *B60W 10/08* (2013.01); *B60W 10/18* (2013.01); *B60W 30/18036* (2013.01); *B62D 1/16* (2013.01); *B62D 53/0864* (2013.01); *B62D 59/04* (2013.01); *B60L 50/64* (2019.02); *B60L 58/12* (2019.02); *B60L 2240/12* (2013.01); *B60L 2240/423* (2013.01); *B60L 2240/54* (2013.01); *B60W 2510/083* (2013.01);
(Continued)

(58) Field of Classification Search
CPC ........... B60W 30/02; B60W 30/18036; B60W 10/18; B60W 10/08; B60W 2540/10; B60W 2520/10; B60W 2510/244; B60W 2710/083; B60W 2510/083; B60W 2720/10; B60W 2710/244; B62D 1/16; B62D 53/0864; B60K 7/0007; B60L 2240/12; B60L 11/1879; B60L 11/1861; B60L 2240/54; B60L 2240/423
USPC ........................................... 701/1, 22
See application file for complete search history.

(56) References Cited

U.S. PATENT DOCUMENTS 5,246,081 A * 9/1993 Engle .................. B61D 47/005
                                               180/168
5,343,969 A * 9/1994 Taylor .................. B60P 3/1083
                                               180/11

(Continued)

FOREIGN PATENT DOCUMENTS

CA    2984156 A1    11/2016
CN    107921884 A    4/2018
(Continued)

OTHER PUBLICATIONS

International Search Report and Written Opinion issued in WIPO Patent Application PCT/CA2018/050633 dated Jun. 12, 2018.
U.S. Appl. No. 62/488,491.

*Primary Examiner* — Jaime Figueroa
(74) *Attorney, Agent, or Firm* — Ridout & Maybee LLP

(57) ABSTRACT

The disclosure is directed at a method and apparatus for an active convertor dolly for use in a tractor-trailer configuration. In one embodiment, the apparatus includes a system to connect a tractor to a trailer. The apparatus further includes a charge generating system for translating the mechanical motions or actions of the dolly into electricity or electrical energy so that this energy can be used to charge a battery or to power other functionality for either the dolly or the tractor-trailer. The active dolly may also operate to assist in shunting the tractor-trailer.

9 Claims, 14 Drawing Sheets

US 10,449,954 B2
Page 2

(51) Int. Cl.
  *B65D 53/08* (2006.01)
  *B60W 10/18* (2012.01)
  *B60W 10/08* (2006.01)
  *B60W 30/18* (2012.01)
  *B60K 7/00* (2006.01)
  *B62D 53/08* (2006.01)
  *B62D 1/16* (2006.01)
  *B60L 58/12* (2019.01)
  *B60L 50/64* (2019.01)

(52) U.S. Cl.
  CPC ... *B60W 2510/244* (2013.01); *B60W 2520/10* (2013.01); *B60W 2540/10* (2013.01); *B60W 2710/083* (2013.01); *B60W 2710/244* (2013.01); *B60W 2720/10* (2013.01)

(56) References Cited

U.S. PATENT DOCUMENTS

| | | | |
|---|---|---|---|
| 7,451,841 B2 * | 11/2008 | Nelson | B62D 51/04 180/13 |
| 8,365,674 B2 * | 2/2013 | Banwart | B61B 1/00 105/159 |
| 8,534,694 B2 * | 9/2013 | Banwart | B61D 3/187 280/476.1 |
| 8,794,656 B2 * | 8/2014 | West | B60D 1/015 280/476.1 |
| 9,126,644 B2 * | 9/2015 | Banwart | B62D 53/0842 |
| 9,694,712 B2 | 7/2017 | Healy | |
| 9,802,508 B1 | 10/2017 | Healy | |
| 9,937,819 B2 | 4/2018 | Healy | |
| 10,118,505 B2 | 11/2018 | Healy | |
| 2001/0003393 A1 | 6/2001 | Cooper | |
| 2005/0023050 A1 * | 2/2005 | Chidlow | B60D 1/66 180/11 |
| 2007/0040353 A1 * | 2/2007 | Dallaire | B60Q 1/305 280/476.1 |
| 2007/0193795 A1 | 8/2007 | Forsyth | |
| 2011/0072999 A1 * | 3/2011 | Banwart | B61B 1/00 104/26.1 |
| 2011/0074132 A1 * | 3/2011 | Banwart | B61D 3/187 280/476.1 |
| 2012/0080866 A1 * | 4/2012 | West | B60D 1/015 280/476.1 |
| 2013/0079980 A1 | 3/2013 | Vuk et al. | |
| 2014/0015223 A1 * | 1/2014 | Banwart | B62D 53/0842 280/476.1 |
| 2015/0307142 A1 | 10/2015 | Layfield et al. | |
| 2017/0106891 A1 * | 4/2017 | Wang | B60L 11/1818 |
| 2018/0086227 A1 | 3/2018 | Healy et al. | |
| 2018/0093655 A1 | 4/2018 | Healy et al. | |
| 2018/0236994 A1 | 8/2018 | Healy et al. | |
| 2018/0304944 A1 | 10/2018 | Wright | |

FOREIGN PATENT DOCUMENTS

| | | |
|---|---|---|
| EP | 3288794 A4 | 8/2018 |
| JP | 2018523447 A | 8/2018 |
| KR | 20180025846 A | 3/2018 |
| MX | 2017014004 A | 8/2018 |
| WO | 2018218351 | 6/2018 |

* cited by examiner

METHOD AND APPARATUS FOR AN ACTIVE CONVERTOR DOLLY

FIELD OF THE DISCLOSURE

This disclosure relates generally to the road transportation industry. More specifically, the disclosure is directed at a method and apparatus for an active convertor dolly.

BACKGROUND OF THE DISCLOSURE

Transportation of goods across road networks is typically accomplished by way of a transport truck to which a transport trailer is attached. The truck provides the engine and the trailer provides the cargo space to transport goods within. A recent trend in the transportation of goods by road is the expansion of the size of transport trucks. This expansion is accomplished by both larger trucks and larger trailers. Fewer trips with larger loads can be more efficient in certain circumstances. One way to achieve larger loads is to add a pup trailer behind the main trailer. A transport trailer with the pup trailer may be called a transport trailer train.

The typical equipment used to attach a pup trailer to a transport trailer is called a converter dolly. Current convertor dollies are passive and limited in their use and application.

Therefore, there is provided a novel method and apparatus for an active convertor dolly.

SUMMARY OF THE DISCLOSURE

The disclosure is directed at a novel method and apparatus for an active converter dolly that provides enhanced applications. In another embodiment, the disclosure may be directed at an active dolly converter that assists in the fuel economy of transport trucks.

In one aspect of the disclosure, there is provided an active converter dolly including a frame portion including a trailer/truck connecting portion and a trailer connecting portion; a charge generation system mounted to the frame portion; and a control system for controlling the active converter dolly.

In another aspect the trailer/truck connecting portion includes a fifth wheel assembly. In a further aspect, the trailer/truck connecting portion includes a hitch. In yet another aspect, the charge generation system includes a system for generating electricity from mechanical actions of the active converter dolly; and a battery for storing the electricity. The charge generation system further includes a set of motors for controlling the wheels of the dolly.

In yet another aspect, the control system includes a control module for monitoring a battery level; and a dolly control system for controlling the charge generation system. In an embodiment, the system further includes a motor/generator drive; wherein the motor/generator drive is controlled by the dolly control system to enable torque to be generated to assist trailer operation. In another aspect, the system further includes a set of sensors in communication with the dolly control system.

In an aspect, the system includes a steering column mountable to the frame portion wherein the active converter dolly is independently movable.

In a second aspect of the disclosure, there is provided a method of controlling an active converter dolly including receiving truck and truck engine information signals from a truck on board diagnostics (OBD) system; processing the truck control signals; and transmitting motor/generator drive control signals to a motor/generator drive based on the truck and truck engine information signals.

In another aspect, processing the truck and truck engine information signals includes processing the truck and truck engine information signals via a power line communicator unit. In a further aspect, the truck and truck engine information signals includes signals representing a level of braking and the motor/generator drive control signals include signals to apply a corresponding brake torque. In yet a further aspect, the truck signals includes signals indicating a truck is starting up and the motor/generator drive control signals include signals to generator a torque to assist start-up of the truck. In another aspect, processing the truck control signals includes receiving sensor signals; and determining motor/generator drive control signals based on the sensor signals to improve performance and fuel savings for a tractor-trailer. In an embodiment, the sensor signals are global positioning signals (GPS), Inertial Measurement Unit (IMS) sensor signals or real-time traffic and road information.

In another aspect, processing the truck control signals includes generating the motor/generator drive control signals with respect to trailer shunting instructions. In yet another aspect, processing the truck control signals includes determining motor/generator drive control signals to improve tractor-trailer stability and control. In yet a further aspect, processing the truck control signals includes determining motor/generator drive control signals based to assist in tractor-trailer back-up operation.

BRIEF DESCRIPTION OF THE DRAWINGS

Reference will now be made by way of example only to preferred embodiments of the disclosure by reference to the following drawings in which.

DETAILED DESCRIPTION OF THE EMBODIMENTS

The disclosure is directed at a method and apparatus for an active convertor dolly for use in a tractor-trailer configuration. In one embodiment, the apparatus includes a system to connect a tractor to a trailer. The apparatus further includes a charge generating system for translating the mechanical motions or actions of the dolly into electricity or electrical energy so that this energy can be used to charge a battery or to power other functionality for either the dolly or the tractor-trailer.

Figure 1:
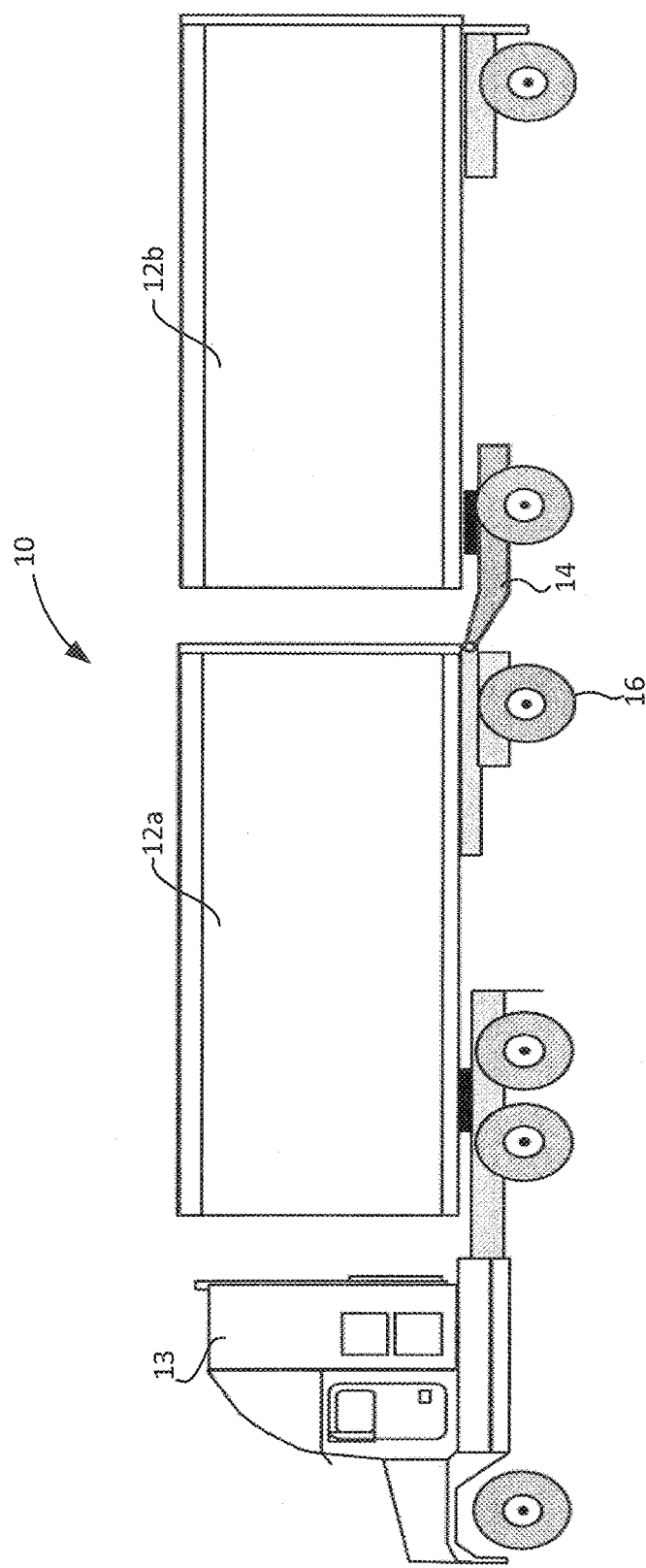
FIG. 1 is a side view of a tractor-trailer including an active converter dolly.

Turning to FIG. 1, a schematic diagram of a tractor-trailer configuration is shown. The tractor-trailer 10 includes tractor 13, cab or truck that pulls a pair of trailers 12 (seen as a primary trailer 12a and a secondary trailer 12b) that are connected to each other via an active convertor dolly 14. The active convertor dolly 14 connects the two trailers 12a and 12b together such that they move with respect to each other when the tractor 13 is in motion.

In the current embodiment, the active convertor dolly 14 includes an apparatus for translating mechanical motion experienced by the dolly 14 into an electric charge which allows the dolly 14 to be used for other applications. In one embodiment, the electric charge can be used to charge a battery while in another embodiment, the electric charge may be used to power auxiliary devices like a refrigeration or A/C unit mounted to the tractor-trailer 10. In another embodiment, the charged battery can be used to jumpstart a dead truck or to supply power to accessories when the engine of the tractor 13 is off. In another embodiment, the charged battery can be used to assist the tractor by providing torque to the dolly's wheel through its motor(s)/generator(s). While the active convertor dolly 14 may generate charge from other wheels and axles within the tractor-trailer 10, such as in a series or parallel implementation, to charge the battery, in the preferred embodiment, the active convertor dolly 14 can be seen as a through-the-road (TTR) hybrid vehicle as it preferably operates independently from the other axles of the trailers 12 of the tractor-trailer 10. This will be described in more detail below.

Figure 2A:
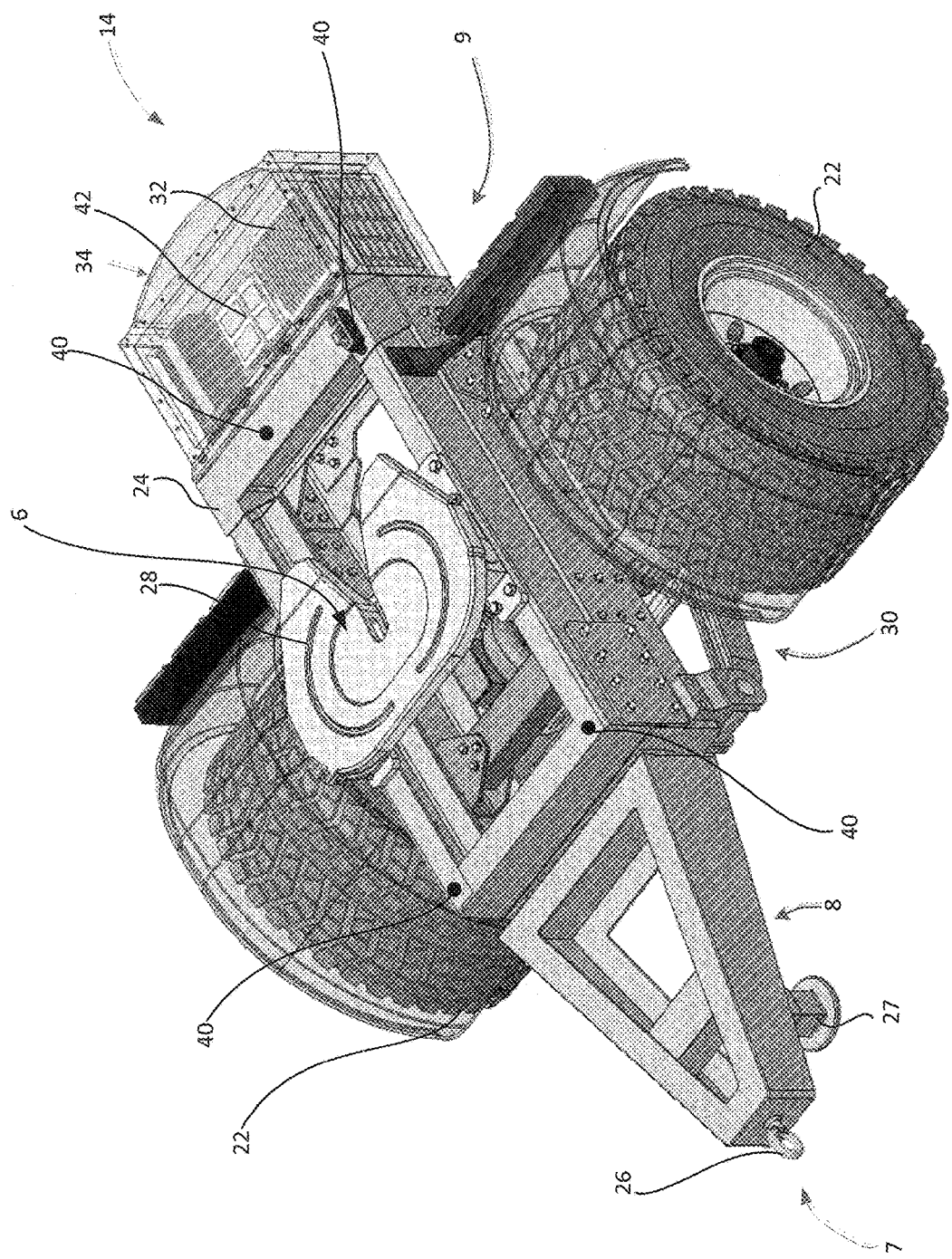
FIG. 2a is a perspective view of another embodiment of an active converter dolly.

Turning to FIG. 2a, a perspective view of one embodiment of an active convertor dolly is shown.

In this embodiment, the active converter dolly 14 includes a frame 24 including a wheel supporting portion, or end, 9 along with a tongue portion, or end 8. The frame can be manufactured from different materials such as, but not limited to, high strength steel, carbon fibre, aluminum, or other materials. As will be understood, the dolly 14 does not have to be made entirely from one material and may be a combination of at least two different materials. As will be discussed in more detail below, the lightweight nature of the composite materials may also provide a benefit or advantage in terms of fuel savings. In a preferred embodiment, the frame is made from lightweight composites in combination with metal components where required for strength or reinforcement purposes.

A primary trailer connection assembly 7, which in the current embodiment can be seen as a hitch 26, forms part of the tongue portion 8 and is located at one end of the frame 24 for connecting the converter dolly 14 to the primary trailer 12a. The connection between the primary trailer and the converter dolly 14 will be well understood by one skilled in the art. Although not shown, the tongue end of the frame 24 may also include safety chains and at least one wiring harness connection for enabling or securing the primary trailer to the dolly 14. Along with the hitch portion, the primary trailer 12a and the dolly 14 may be connected via an electric cable which is capable of delivering power from the trailer 12a to the dolly 14. A support leg or apparatus 27 is also attached to the frame 24 at the tongue end 8.

The dolly 14 has at least one wheel supporting portion 9 or axle. The wheel supporting portion 9 includes a set of wheels 22 mounted on opposite sides of the frame 24. In the current embodiment, each wheel set includes two wheels to improve the load bearing capacity of the active converter dolly 14.

According to one embodiment, each wheel set may be separately mounted to the frame 24. In other words, there is no common axle nor differential associated with the opposed wheel sets. Instead each wheel set is mounted to its own electric motor wheel assembly.

In the current embodiment, the secondary trailer mounting assembly 6 can be seen as a fifth wheel assembly 28 that is mounted to a top of the frame 24. The fifth wheel assembly 28 may include an upwardly facing portion having a slot for receiving a corresponding protrusion from the secondary trailer for mounting, or attachment, of the secondary trailer to the converter dolly 14. The fifth wheel assembly 28 is preferably supported by a spring suspension system (not shown).

The active convertor dolly 14 further includes the charge generating system 30 that generates an electric charge during certain mechanical actions by the dolly 14. The electric charge is preferably used to charge the battery 32 that is mounted to the frame 24 within an enclosure 34 to protect the battery 32 from any damage. In a preferred embodiment, the enclosure 34 is waterproof and durable. A schematic diagram of the charge generating system 30 is shown in FIG. 2b.

Figure 2B:
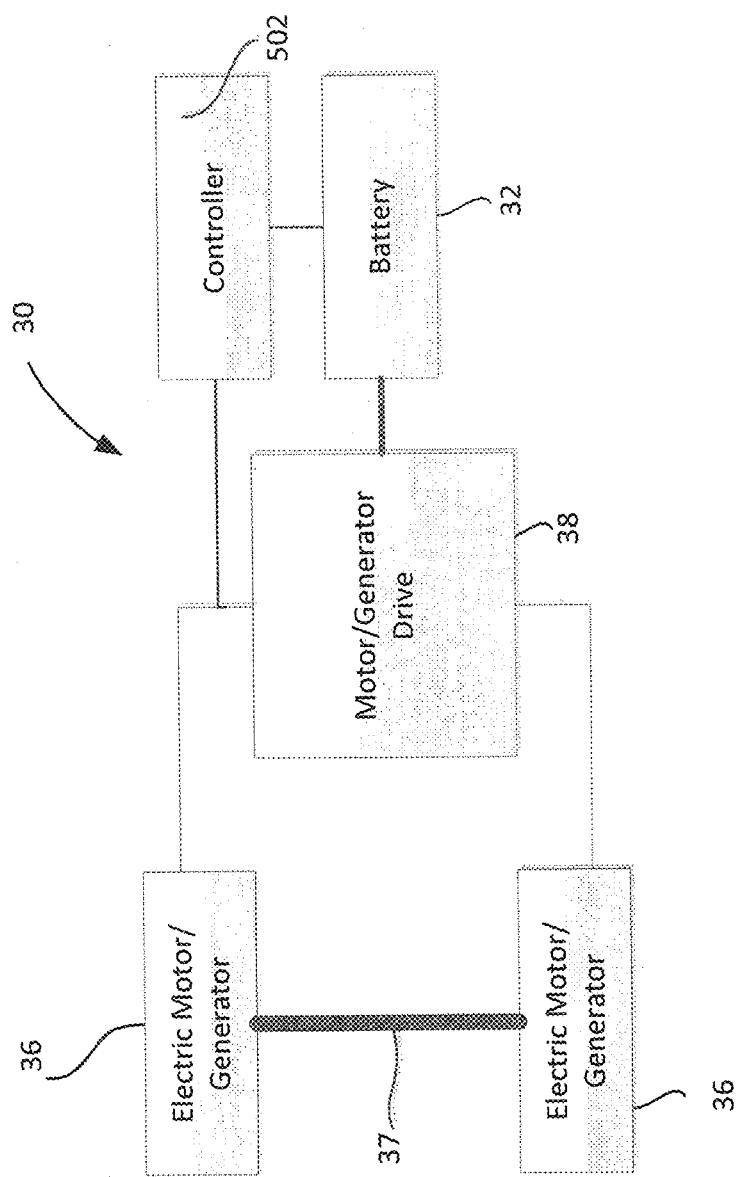
FIG. 2b is a schematic diagram of one embodiment of a charge generating system for an active converter dolly.

As schematically shown in FIG. 2b, the system 30 includes a set of electric motors/generators 36, which in the current embodiment is two, mounted to an electric axle 37 that connects the wheels 22 (as shown in FIG. 2a). The motor/generator is used to convert the electric energy stored in the battery to mechanical energy by rotating the wheel (motor mode) or convert the mechanical energy to electric power (generator mode) through the rotating wheel. In the current embodiment, the electric motors/generators are preferably located proximate the wheels 22 of the dolly 14. Although two motors 36 are shown, it will be understood that the system 30 may include only a single motor/generators (such as located along the axle between the two wheels through a differential) or may include more than two motors/generators. The motor/generator controls the movement of the tires via the axle 37 based on signals transmitted from a dolly controller. This will be described in more detail below. In one embodiment, a motor/generator drive 38 receives the electric power generated in the electric motor/generator through regenerative braking for example, of the dolly 14 to charge the battery 32 and later power the electric motors 36. Regenerative braking is an energy recovery mechanism which slows a vehicle by converting its kinetic energy into electric form. Another form of energy for recovery to be generated or translated into electricity may be gravitational potential energy due to elevation which can be harvested while the vehicle is driving downhill. Another time of converting kinetic energy into electric form is when the truck's engine is running at high efficiency and the battery is at low charge.

The convertor dolly 14 may further include a plurality of onboard instrumentation within the control system or controller that communicate with equipment, such as sensors 40, that may be used for, among other applications, to assist with steering, stability, determining the proximity of the dolly to foreign objects such as barriers and obstacles, or receiving road grade information. In one embodiment, the sensors 40 may be used to assist in aligning the primary and secondary trailers 12a and 12b when the tractor-trailer 10 is moving in reverse. Furthermore, in a preferred embodiment, sensors may be used to help identify the relative position of the converter dolly 14 to other elements or components of the tractor-trailer 10. The output from the sensors can be fed into one or more dolly control systems (preferably located within the enclosure 34) where such information can be used to control the dolly 14. A schematic diagram of a dolly control system is shown and described in more detail with respect to FIG. 5.

Figure 3:
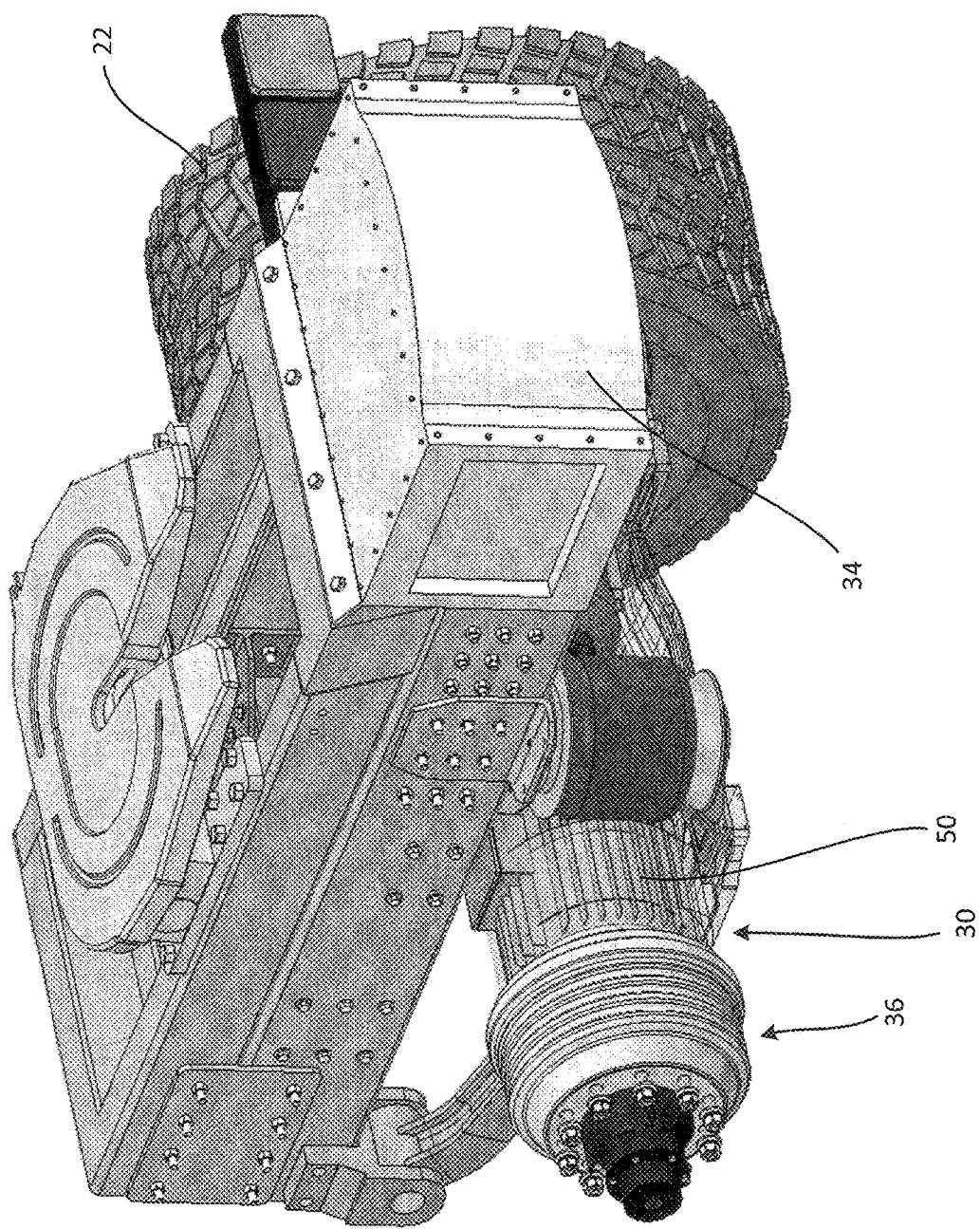
FIG. 3 is a perspective view of the active converter dolly.

FIG. 3 is a schematic rear view of the dolly of FIG. 2a. Some components of the dolly have been removed for ease of understanding of the disclosure. For instance, one wheel set 22 and parts of the frame have been removed.

The charge generation system 30 includes an electric motor/generator wheel assembly 50 that can be seen as an integrated electric motor wheel assembly. Although not shown, a similar wheel assembly is preferably mounted adjacent the other wheel 22.

In operation, as the tractor-trailer starts to brake, the motor/generator wheel assembly 50 captures the kinetic energy of the dolly whereby this energy may flow via the motor/generator drive 38 to the battery 32. Typically, the combination of electric motor(s)/generator(s) 36 and drive 38 converts the kinetic energy into electricity before it is transmitted to the battery 32.

The battery and control enclosure 34 is mounted on the dolly frame 24 for example but not limited on the sides, or the back as shown in FIG. 2a. As outlined above, the control enclosure 34 is preferably formed from a durable waterproof and corrosion resistant material such as a composite or aluminum, which is also preferably lightweight for fuel economy reasons. By being both waterproof and corrosion resistant, the enclosure 34 provides a durable compartment for the converter dolly 14.

Figure 4:
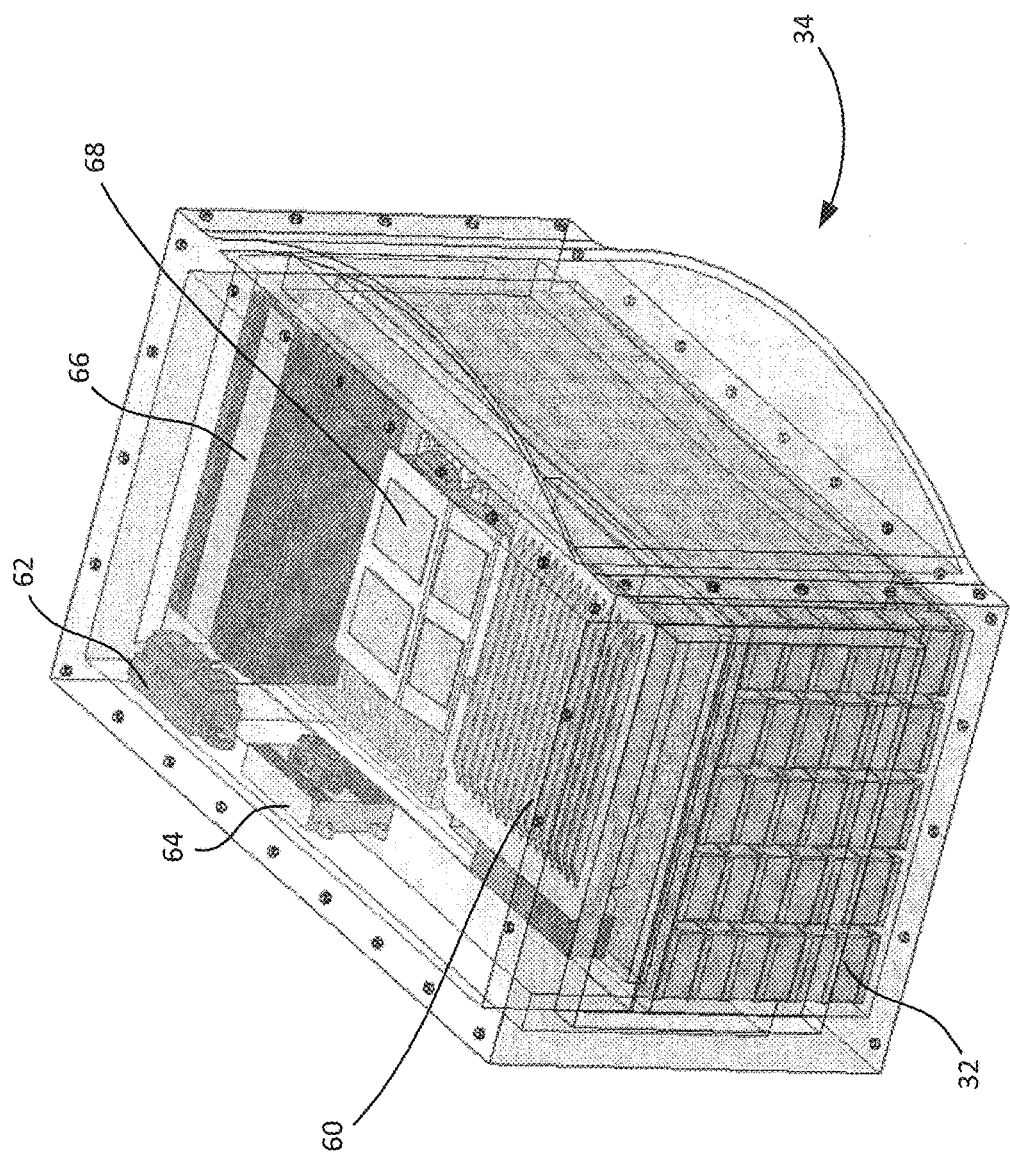
FIG. 4 is a perspective view of a battery enclosure of the active converter dolly.

Turning to FIG. 4, a perspective view of one embodiment of a battery enclosure 34 is shown. In the current figure, the walls of the enclosure are shown as being transparent so that the contents of the enclosure can be seen.

In this embodiment, the enclosure 34 houses a control module 60 which can be seen as a battery and control module. The control module 60 preferably performs multiple functions for the convertor dolly 14. In one embodiment, the control module is used to monitor and control the battery 32. It also be used to control motors/generators through their drives for both motoring and generating modes. Furthermore, the control module 60 may monitor and control battery, or batteries charging via external plug-in sources. The control module 60 may also include an intelligent power dispatch system to determine when to power the wheels via the motor/generators 36. Furthermore, the control module 60 may include an intelligent steering system to control simultaneous braking/traction of opposite wheels and/or provide shunting operation of the active converter dolly. In another embodiment, the control module 60 may be used to set up the charge generating system 30 for regenerative braking or for auxiliary power depending upon the road circumstances and the condition of the load on the tractor engine.

The enclosure 34 preferably also houses the battery 32, which in the preferred embodiment is a modular lithium-ion battery system. The enclosure 34 may also house a sensor interface 62 which communicates with the sensors 40 located throughout the dolly. The sensor interface 62 may communicate with the sensors 40, to assist, for example, with using the dolly 10 to direct the steering of the trailer(s) when the tractor trailer is moving in reverse. While shown separately, the sensor interface 62 can be integrated within the control module 60.

In one embodiment, the enclosure 34 may also house a gyroscope self-balancing control system 64 and an off-board power interface 66. The gyroscope self-balancing control system 64 may be in communication with the dolly control system to transmit signals which can be used for example, to be part of a self-balancing control system for the converter dolly. In the event that the converter dolly is self-balancing, the presence of a landing wheel may not be necessary.

The off board power interface 66 may be used to connect the battery 32 to off-board charging systems and/or off-board loads. The enclosure 34 preferably includes a tractor interface 68 that communicates with tractor engine information system. In a preferred embodiment, the tractor interface 68 is part of the control module 60. The enclosure 34 may also house an interface to receive the throttle level (not shown) of the main tractor. The tractor and tractor engine information such as but not limited to throttle level, engine torque, engine speed, etc. are used in the active converter dolly control system via an interface to determine when to recover and when to expend recovered energy to assist in increasing the fuel economy of the tractor-trailer system.

In one embodiment of the battery enclosure 34, a forward exterior surface of the battery enclosure 34 may be configured to reduce drag. Various aerodynamic profiles can be used and the profile shown is not intended to be limiting. In some cases, the low positioning of the battery enclosure may allow for a ground effect design to be employed, meaning that the shape will take into account both the passage of air from in front and past the leading edge, as well as air passing below the leading edge between the leading edge and the ground. According to a preferred embodiment of the disclosure, the battery control enclosure is located at a low level between the wheels such that the weight of the battery system to be located as low down as is practical to have a lower centre of gravity to improve road handling and control of the active dolly 14 during transport. In another embodiment, the system may include a lightweight composite chassis (or frame) which is aerodynamic by design and includes the enclosures for the batteries and controls.

Figure 5A:
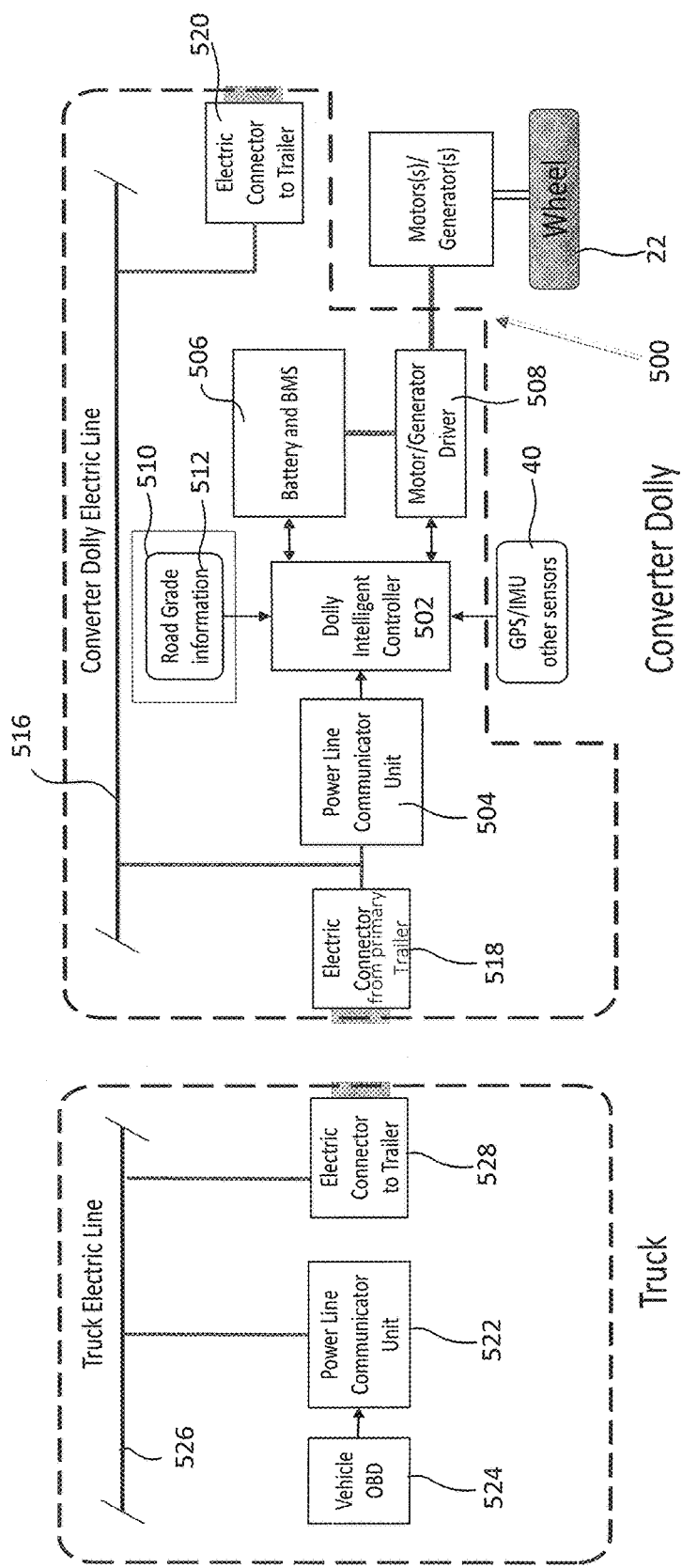
FIG. 5a is a schematic view of an active converter dolly control system.

Turning to FIG. 5a, a schematic diagram of a dolly control system for the converter dolly is shown. In the current embodiment, certain components of a trailer which are in communication with the converter dolly control system 500 are also schematically shown.

The converter dolly control system 500 includes an intelligent controller 502 which is, in one embodiment, implemented within a central processing unit (CPU). In this embodiment, the intelligent controller 502 is in communication with the tractor OBD unit via a power line communicator unit 504 to receive the tractor or truck (tractor and truck are used interchangeably here) and tractor engine information. Wireless communication can also be used instead of the power line communicator unit 504 to connect the tractor OBD to the dolly control system 502. The dolly control system 502 also communicates with the set of sensors 40, such as but not limited to, a Global Positioning Sensor (GPS) or an Inertial Measurement Unit (IMU) sensor. The intelligent controller 502 is also in two-way communication with a battery and battery management system (BMS) unit 506 and a motor/generator drive 508. The battery and BMS unit 506 is also connected to the drive 508.

The motor/generator drive 508 is further connected to, or in communication with, the set of motors/generators 36 (see FIG. 2b) that are associated with an individual wheel 22. As schematically shown in FIG. 2b, the number of motor/generators in the current set is two.

The intelligent controller 502 is also connected to a database 510 including road grade information 512 which can be stored within a database or based on sensor information, or real time road information by connecting the dolly intelligent controller 502 to wireless network. Separate connectors, seen as an electric connector from the trailer 518 and an electric connector to the trailer 520 are also connected to the electric line 516. As will be understood, one of the connectors 518 or 520 is connected to the primary trailer and the other connector is connected to the secondary trailer.

The intelligent controller 502 may further include an interface of a module allowing the controller to be monitored by a user over the Internet.

The truck or tractor includes a power line communication unit 522 that converts information from a vehicle on-board diagnostics (OBD) system 524 to be sent via the truck electric lines. In another embodiment, the OBD information can be converted and transmitted wirelessly. The truck or tractor power line communication unit 522 is connected to the electric line 526 which, in turn, is connected to an electric connector to a trailer 528. In use, the electric connector to trailer 528 and the electric connector from trailer 518 are connected via a cable to each other to deliver power and OBD information from the truck to all the connected trailers and dollies to the tractor.

In the current embodiment, the transmission of signals between the vehicle OBD 524 and the intelligent controller 502 is via the electric line where the signals from the vehicle OBD are converted by the power line communicator unit 522 which then uploads the converted signal to the truck electric line. At the dolly end, the signals are received by the power line communication unit 504 which then extracts the converted OBD signals and then decrypts or converts these signals into a format understood by the controller 502. In another embodiment, the signals may be communicated or transmitted wirelessly between the vehicle OBD and the intelligent controller.

In operation, as the tractor-trailer is in motion, the intelligent controller 502 receives and transmits signals to the other components of the controller system. For instance, the intelligent controller 502 can communicate with the sensors 40 to receive signals representing various data that the controller 502 can use to assist in improving operation of the tractor-trailer and the dolly.

Figure 5B:
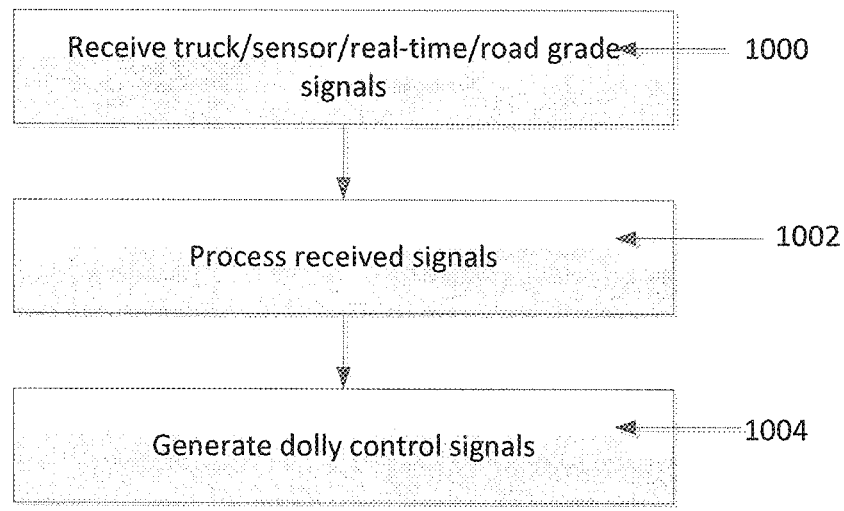
FIG. 5b is a flowchart outlining one embodiment of controlling an active converter dolly.

A method of convertor dolly control is shown with respect to FIG. 5b. As the truck is driving, the vehicle OBD 524 collects various truck information with respect to characteristics of the truck. For instance, this information may include, but is not limited to, a position of the brake pedal or braking torque, amount of torque being generated by the engine, the speed of the engine, etc. The sensors may also collect sensor information associated with various dolly characteristics such as listed above. Other information may include road grade information, map information or any real-time information and the like.

All, or parts of this, information is then transmitted to, and received by, the intelligent controller 502 within the dolly (1000). In terms of the signals received from the vehicle OBD, in one embodiment, the digital signals from the vehicle OBD 524 are converted by the power line communication unit 522 and then transmitted over the truck electric line 526. These signals are then retrieved, or received, by the power line communicator unit 504 within the dolly and then extracted, and, if necessary, re-converted before being received by the controller 502. As will be understood, the power line communicator unit 504 converts the extracted signals into a format understandable by the controller 504. As will be understood, due to the connection between the dolly and the trailers (via the connectors 518 and 520), the dolly control system 502 has access to any signals and electricity that is transmitted over the electric line.

In another embodiment of digital signal transmission, the digital signals may be transmitted wirelessly from the vehicle OBD 524 to the controller 502.

After the controller 502 receives the digital signals, the controller processes the signals (1002) and then generates dolly control signals to control the dolly (1004) based on the digital signals. The dolly control signals may also be seen as motor-generator drive control signals.

For instance, if the truck is braking, the controller 501 may receive digital signals representing the level of braking being applied to the truck. In one embodiment this is determined by the vehicle OBD by monitoring the position of the brake pedal within the truck. After receiving the digital signals, either directly from the vehicle OBD or converted by the power line communicator unit, the controller can generate and send a signal to the motor/generators 36 (via the motor/generator drive 508) to apply a corresponding regenerative brake torque. In this manner, during this regenerative braking, the battery can be charged based on the braking torque value calculated by the controller.

In another embodiment, the controller 502 may receive a digital signal indicating that the truck is being started. If the battery is charged or has some charge, the controller may generate and transmit a signal to the motor/generator to apply or generate a torque to assist start-up of the truck to improve the efficiency of the truck motor.

In another embodiment, if the SOC within the dolly's battery is low, signals relating to the truck engine's maximum efficiency may be received by the controller whereby the controller may then generate and transmit a signal to the charge generating system to charge the battery where possible.

Figure 5C:
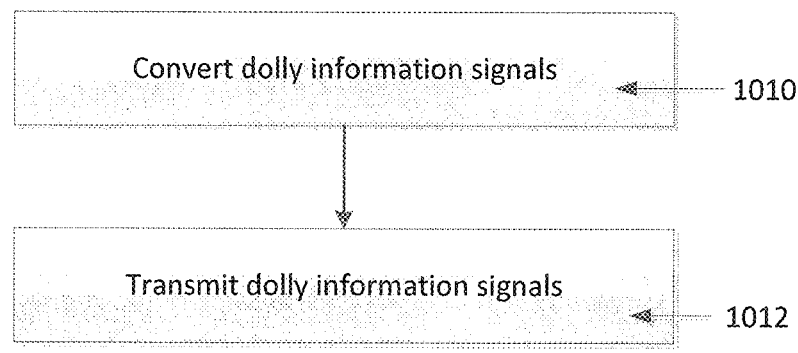
FIG. 5c is a flowchart outlining one embodiment of transmitting signals from the converter dolly control system.

Turning to FIG. 5c, a flowchart outlining a method of communication from the dolly control system is shown. Initially, dolly information signals, which are typically digital, may be converted (1010) if they are being transmitted to a truck driver over the electric line as discussed above. The dolly information may include information relating to the dolly's position, the battery charge, or the like.

The dolly information signals are then transmitted (1012) to specified destinations or individuals, such as, but not limited to, the truck driver or a fleet manager. As will be understood, the signals may be transmitted wireless or via the electric line to the truck driver. The signals being transmitted to the fleet manager is preferably performed wirelessly.

The active converter dolly 14, as outlined above, is a TTR hybrid system. As such, the dolly of the disclosure operates in different operational modes.

In one mode, the active dolly does not participate in extracting or providing power to the tractor-trailer system. In this mode the converter dolly will be passive. In another mode, whereby auxiliary loads (for example cabin's or trailer's A/C system), is driven by the charge generating system of the dolly or the stored energy in its battery. In yet another mode, the energy in the dolly's battery is used to provide traction torque in the dolly's tires to assist the motion of the tractor-trailer system. In another mode, the dolly is used to extract and convert the mechanical power in the rotation of its wheels into electric power via its motor/generators. The electric power then can be used to be stored in the battery and/or run auxiliary devices of the truck-tractors. This mode is activated during regenerative braking or when the truck-trailer drives downhill, or when battery needs to be charged in which it is activated when the engine is operating at high efficiency.

In further designing one embodiment of the dolly, certain driving conditions are considered. These conditions may include, but are not limited to, acceleration—when the vehicle's velocity is increasing; deceleration—when the driver releases the accelerator pedal and may press the brake pedal; and cruising—when the road load and the vehicle's velocity are constant.

Figure 7:
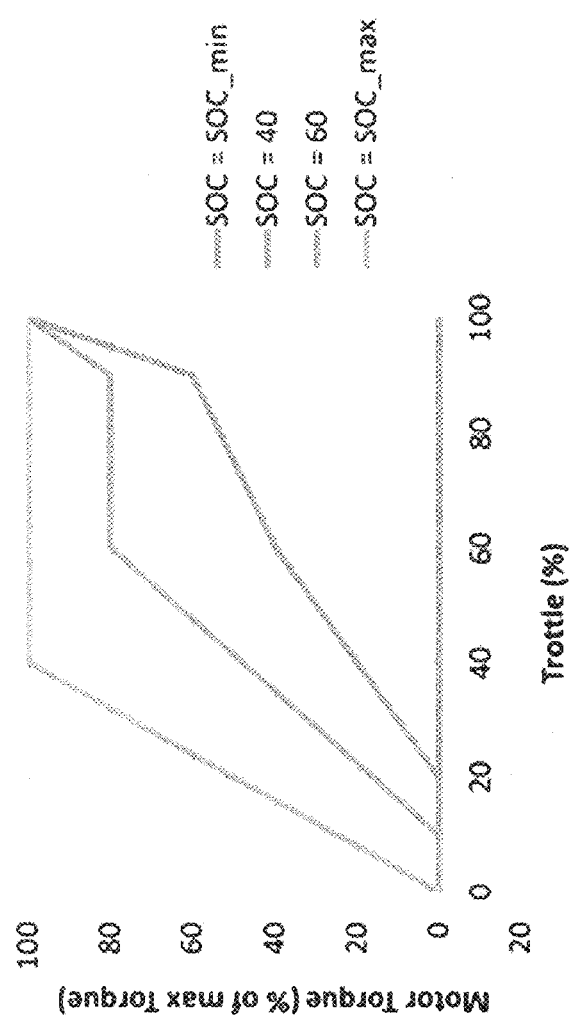
FIG. 7 is a chart outlining motor torque vs. throttle.

During acceleration, if there is enough charge in batteries, where the state of charge (SOC) of the battery is greater than the SOC threshold acceleration, the dolly assists the truck's powertrain via the electric motor associated with the dolly wheels, provides an additional boost torque in addition to the torque generated by the tractor. In one embodiment, the SOC threshold acceleration can be a predetermined threshold calculated via experiments or system optimization calculations. This boost torque depends on vehicle speed, the battery's SOC, and accelerator pedal position. A sample map for electric motor output during acceleration at a sample vehicle speed equal to 50 km/h for various battery SOCs is shown in FIG. 7.

Figure 8:
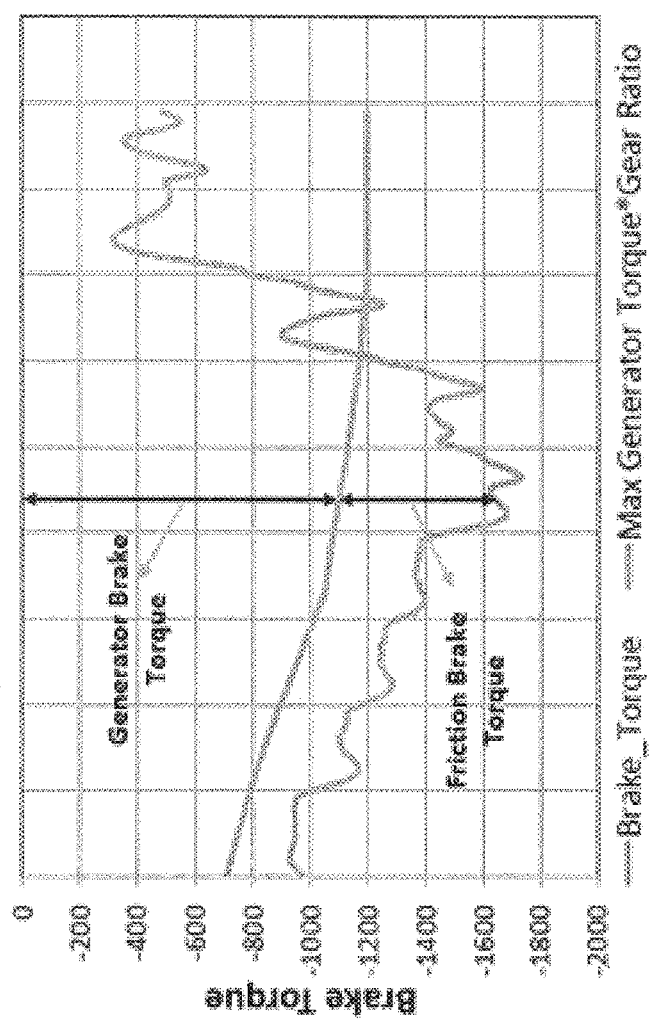
FIG. 8 is a chart outlining showing regenerative and friction brake torque blending.

During deceleration, if the battery is or batteries are not fully charged, dolly typically does not assist the truck nor add any load to the truck to extract any energy. During coasting and based on the battery's SOC, the dolly could extract power via the generator for charging the batteries. However, when the brake pedal is depressed, parallel regenerative braking is actuated. Depending on vehicle speed and consequently, the generator's rotational speed, for approximately 10-20% of initial brake pedal travel, the friction brakes are not engaged and only regenerative braking is applied. During harder braking conditions, depending on the value of generator speed and max torque, the braking energy may not completely regenerated. In these situations, the excessive amount of braking torque is applied by friction braking, as shown in FIG. 8. This process is called brake torque blending.

Figure 9B:
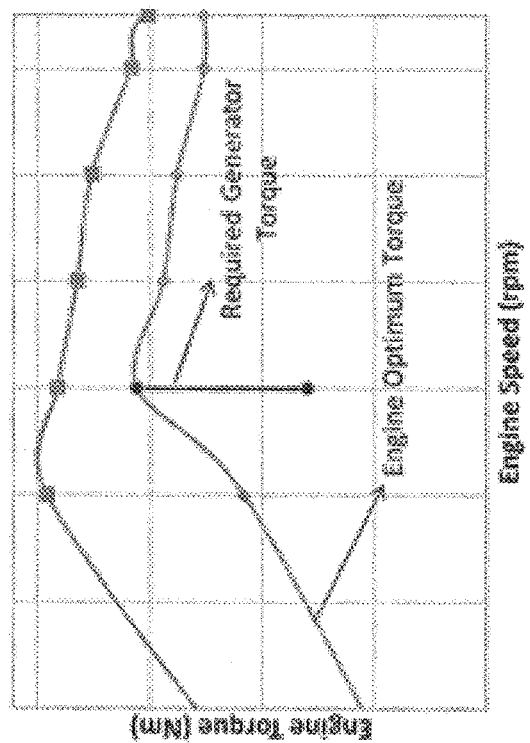
FIG. 9b is a chart outlining engine torque vs engine speed for a second active converter dolly operational mode.
Figure 9A:
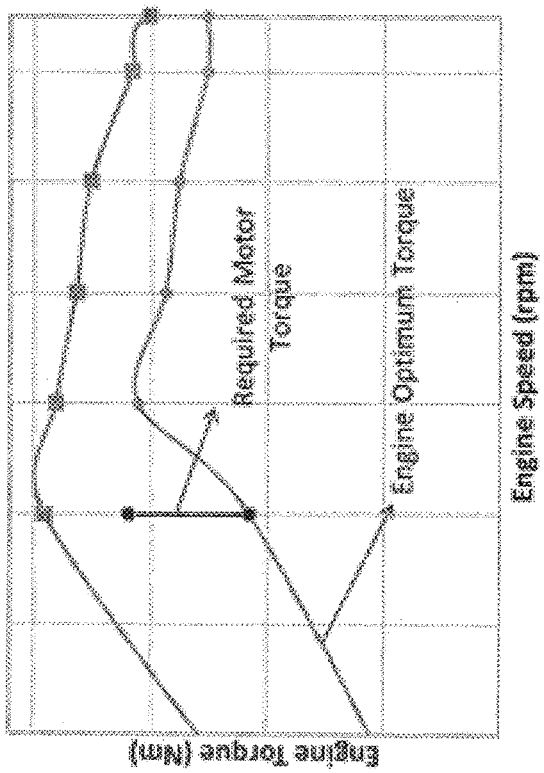
FIG. 9a is a chart outlining engine torque vs engine speed for one active converter dolly operational mode.

During cruising, depending on the status of load, or drive torque, relative to optimum load, or drive torque, the dolly can be seen as assisting the truck powertrain, being in active, or extracting power via the generator. In this situation, if the truck powertrain torque, is greater than the optimum torque of the engine at that speed, the dolly will be in assist mode, in which electric motor provides a boost torque in addition to the truck torque output, as shown in FIG. 9a. Consequently, there is a lower torque request from the engine due to the available motor torque, which results in a more-efficient tractor operating point. Finally, if the engine toque is less than the optimum load, or drive torque, the dolly, depends on the SOC of it battery, will be in charging mode and the truck powertrain delivers its power to the load and the load delivers power to electric powertrain, as shown in FIG. 9b. In this situation, some portion of engine power is stored in the batteries by the generator, and the extra requested torque from the ICE moves the current ICE operating point to a more efficient one.

With respect to a specific embodiment of the active converter dolly, certain characteristics of the dolly are required. More specifically, power and performance; powertrain configuration and steerability are preferably taken into account in the design of this embodiment of an active converter dolly.

With respect to the powertrain configuration, two scenarios, seen as an in-wheel motor embodiment and a drive axle embodiment can be considered.

Figure 10:
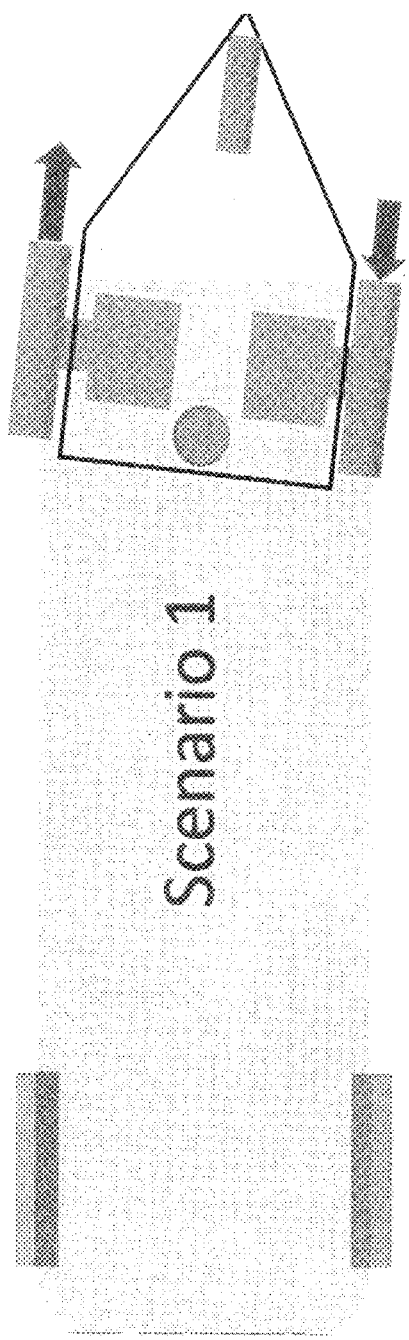
FIG. 10 is a schematic diagram of another embodiment of a charge generating system.

For the in-wheel motors embodiment, in this configuration, the charge generating system 30 includes an axle with two in-wheel motors, such as schematically shown in FIG. 10. As shown in FIG. 10, the dolly 14 is connected to the secondary trailer 12b. The motors 36 can provide the required power for driving, and by applying different traction forces, it can play the role of steering system. While this configuration may require a higher level of modification to be retro-fitted into existing converter dollies, it is more suitable for Vehicle Dynamic Control (VDC) applications because the left and right motors can provide different traction/braking torque. By controlling this properly, a corrective yaw moment is formed, which can be used to improve dynamical behaviour of the combination of the tractor, trailers, and the convertor dolly.

Figure 11:
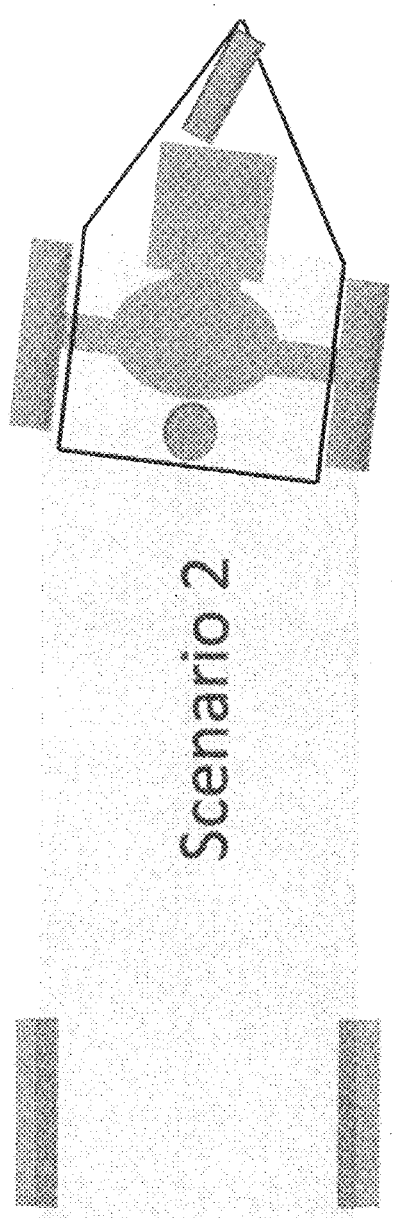
FIG. 11 is a schematic diagram of a further embodiment of a charge generating system.

For the drive-axle embodiment, in this configuration, the axle 37 is a drive axle such as schematically shown in FIG. 11. Unlike the system of FIG. 10, the level of modification for this configuration is lower. Furthermore, the motor/generator reduction gear can also be embedded into the axle (double reduction axle).

Figure 12:
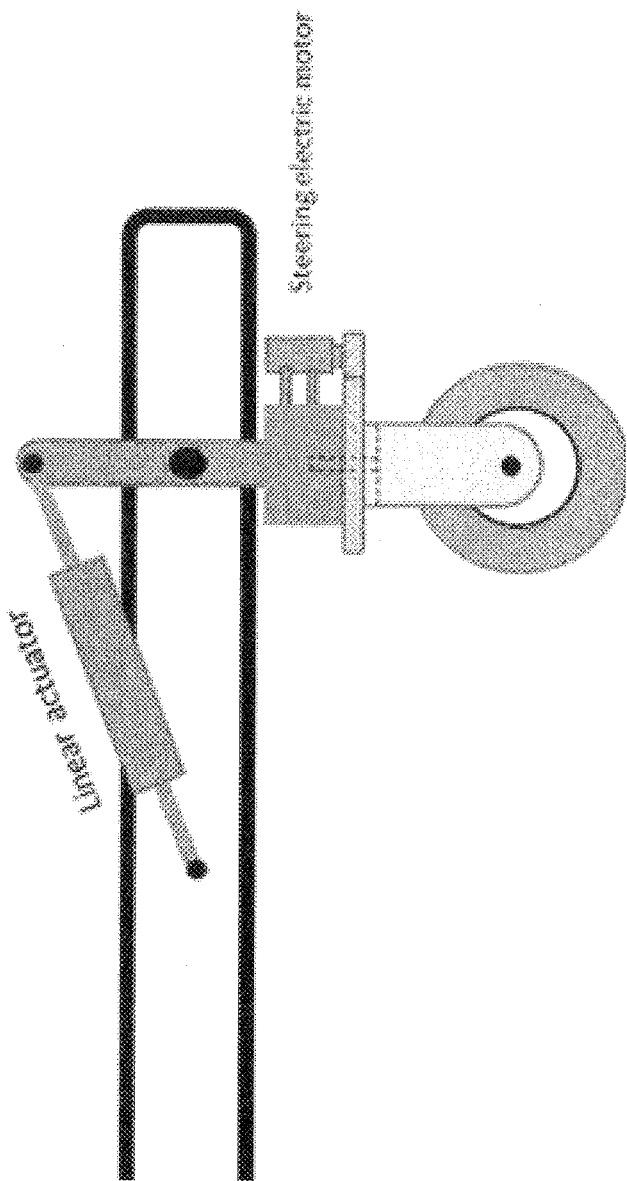
FIG. 12 is a schematic diagram of a steering mechanism for use with the active converter dolly.

When the active dolly is disconnected from a primary trailer but still connected to a secondary trailer, the active dolly can be used to move the secondary trailer without having to go through the hassle of re-mounting the primary trailer. With respect to steerability, in the in-wheel motor embodiment, the steering could be altered by differential torque applied by each motor. In the drive-axle embodiment, a steering mechanism may be integrated with the converter dolly. A schematic of the steering mechanism that can be used for an active convertor dolly is shown in FIG. 12. The steering can be achieved by using a motor. Either an electric or a hydraulic linear actuator can also provide the retractability of steering mechanism, which can also be seen as a third wheel assembly. However, since using the hydraulic actuator requires additional power sources and accessories (hydraulic power and connections), it is preferable to use an electric linear actuator.

Figure 13B:
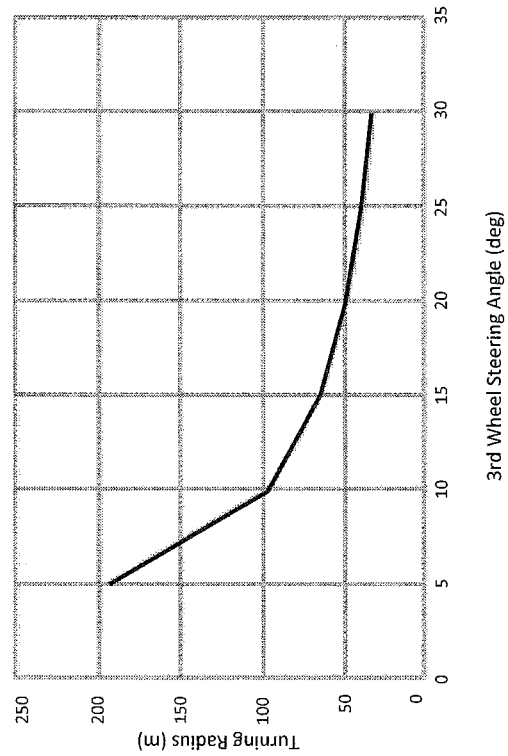
FIGS. 13a and 13b are charts outlining turning radius with respect to different active converter dolly embodiments.
Figure 13A:
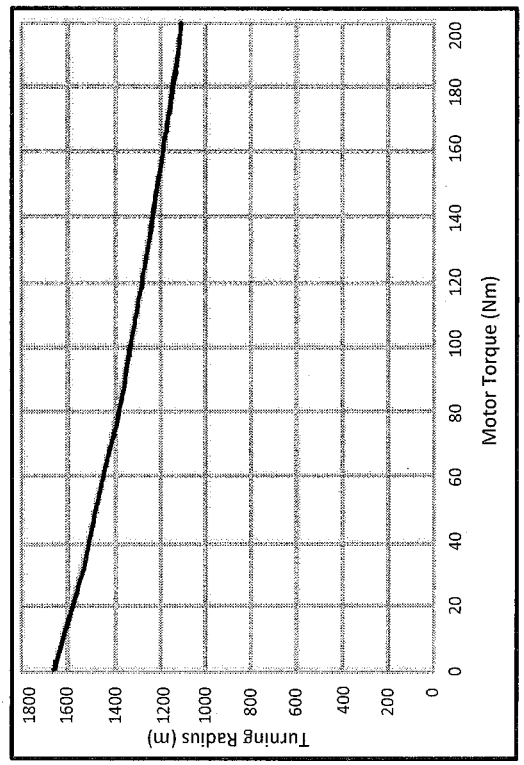

Using the related equation of motion for the articulated vehicles, the steerability of both configurations were investigated. FIGS. 13a and 13b illustrate the turning radius of the trailer equipped with an active convertor dolly with differential torque steering (FIG. 13a) and steering mechanism (FIG. 13b) configurations.

It can now be appreciated that the active dolly does not only improve fuel economy when it is attached to the tractor-trailer but can also be used to shunt a trailer when it is not attached to a trailer with adding a steering mechanism. Although not shown, a steering wheel, joystick, or other interfaces can also be included to communicate with the dolly controller to enable a driver locally or remotely to steer the dolly. As such, the dolly can be used to shunt the secondary trailer around a staging area even when the secondary trailer is disconnected from the tractor. This may be to place the secondary trailer in position for loading or unloading, or to place it in position for being attached to a trailer. Because the dolly is equipped with a steering system and by the dolly control system, the active dolly can be directed or steered into position. In a preferred embodiment, the steering can be manually applied, such as by way of a remote control device. Such a device could be a joystick, smart phone or tablet device which includes a software access to the steering control or mechanism. In this way the active dolly can be controlled remotely while it is being maneuvered into position. Collision avoidance sensors may also be used to help avoid accidents. These may be mounted on the secondary trailer or may be mounted on the active dolly in a way that permits the dolly sensors to see past the edges of the secondary trailer for collision avoidance.

Figure 6:
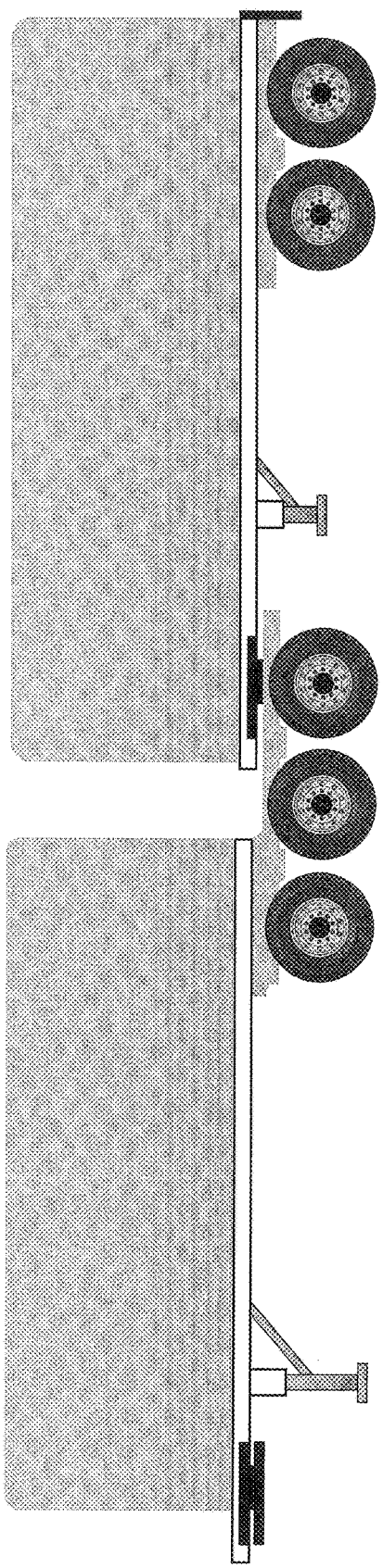
FIG. 6 is a schematic diagram of another embodiment of an active converter dolly for use with a tractor-trailer.

Turning to FIG. 6, another schematic embodiment of an active converter dolly in a B train, in which the active converter is part of the lead trailer. The fifth wheel assembly sits on the rear axle of the lead trailer. Similar to the embodiment discussed previously, A train, the active dolly in B train configuration is capable of adding power to drive the trailer and to being able to capture energy from regenerative braking. In B train active dollies, at least one of the axels is electrified as discussed above for adding power to drive the trailer and to being able to capture energy from regenerative braking. Similarly, in A train active dollies with multiple axles, at least one of the axels is electrified. Electrifying more axles will improve the fuel efficiency and performance of the active dolly.

According to another aspect of the disclosure, the converter dolly may include a central axle, one electric motor and a differential. In this case there is less space to house the enclosure between the wheel sets, however, the other aspects remain the same. The battery enclosure requires an adaptation to permit the axle to traverse the compartment and the motor also needs to be connected through the differential. However, even with a central transverse axle, this second embodiment preferably includes the aerodynamically efficient, lightweight, waterproof and corrosion resistant battery enclosure and an instrumentation package of appropriate modules to allow for interfacing with the main tractor motor control system, to interface with the proximity sensors to provide a back-up steering system, to interface with a remote controller to permit the dolly to be remotely steered around even when disconnected for the tractor trailer train and will allow the dolly to operate equally well in forward or reverse.

In one aspect, the apparatus of the disclosure provides advantages over current converter dollies. For instance, in a preferred embodiment, the active converter dolly of the disclosure reduces fuel consumption emission levels. In another embodiment, the active dolly may operate to assist in fulfilling a power demand (acceleration, grade ability and maximum, or highest, cruising speed) of the tractor-trailer. In another embodiment, the disclosure is directed at maintaining a battery's state of charge (SOC) within a reasonable level, for self-sustaining operation whereby no external charging is required. Also, the disclosure is directed at an active converter dolly that may be able to harvest braking energy to generate electricity.

It will be appreciated by those skilled in the art that various modifications and alterations can be made to the present invention without departing from the scope of the invention as defined by the appended claims. Some of these have been suggested above and others will be apparent to those skilled in the art. For example, although a preferred form of the present disclosure includes separate motors for each wheel set, the present invention can also be used with a cross axle and differential in and single electrical power source, provided the same provides enough total energy to hybridize the truck travel.

In the preceding description, for purposes of explanation, numerous details are set forth in order to provide a thorough understanding of the embodiments; however the specific details are not necessarily required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

The above-described embodiments are intended to be examples only. Alterations, modifications and variations can be effected to the particular embodiments by those of skill in the art without departing from the scope, which is defined solely by the claims appended hereto.

What is claimed is:

1. A method of controlling an active converter dolly comprising:
   receiving truck and truck engine information signals from a truck OBD;
   processing the truck control signals; and
   transmitting motor/generator drive control signals to a motor/generator drive based on the truck and truck engine information signals.

2. The method of claim 1 wherein processing the truck and truck engine information signals comprises:
   processing the truck and truck engine information signals via a power line communicator unit.

3. The method of claim 1 wherein the truck and truck engine information signals comprises signals representing a level of braking and the motor/generator drive control signals include signals to apply a corresponding brake torque.

4. The method of claim 1 wherein the truck signals comprises signals indicating a truck is starting up and the motor/generator drive control signals include signals to generator a torque to assist start-up of the truck.

5. The method of claim 1 wherein processing the truck control signals comprises: receiving sensor signals; and
   determining motor/generator drive control signals based on the sensor signals to improve performance and fuel savings for a tractor-trailer.

6. The method of claim 5 wherein the sensor signals comprise global positioning signals (GPS), Inertial Measurement Unit (IMS) sensor signals or real-time traffic and road information.

7. The method of claim 1 wherein processing the truck control signals comprises:
   generating the motor/generator drive control signals with respect to trailer shunting instructions.

8. The method of claim 1 wherein processing the truck control signals comprises:
   determining motor/generator drive control signals to improve tractor-trailer stability and control.

9. The method of claim 1 wherein processing the truck control signals comprises:
   determining motor/generator drive control signals based to assist in tractor-trailer backup operation.

* * * * *